United States Patent [19]
Cohodar

[11] Patent Number: 5,316,145
[45] Date of Patent: May 31, 1994

[54] ADVERTISING DISPLAY FOR A VIDEO CASSETTE OR LIKE STRUCTURE

[76] Inventor: Alija Cohodar, 1465 NE. 29th St., Pompano, Fla. 33064

[21] Appl. No.: 910,429

[22] Filed: Jul. 8, 1992

[51] Int. Cl.5 ............................................ B65D 85/672
[52] U.S. Cl. ................................. 206/387; 206/459.5
[58] Field of Search ..................... 206/459.5, 387, 444, 206/312, 313, 804

[56] References Cited

U.S. PATENT DOCUMENTS

| | | | |
|---|---|---|---|
| 4,624,423 | 11/1986 | Schoettle et al. | 206/387 X |
| 4,717,021 | 11/1988 | Ditzig | 206/459.5 |
| 5,088,602 | 2/1992 | Heyderman et al. | 206/387 |

FOREIGN PATENT DOCUMENTS

| | | | |
|---|---|---|---|
| 34650 | 10/1908 | Austria | 206/313 |
| 2191173 | 12/1987 | United Kingdom | 206/387 |

OTHER PUBLICATIONS

Moss (cover for cassette) 1980.

Primary Examiner—William I. Price
Attorney, Agent, or Firm—Malloy & Malloy

[57] ABSTRACT

An advertising display or like material insert structurally adapted to be used in combination with a cassette such as video cassette and packaged with the cassette in any one of a variety of designs of cassette containers, such that opening of the container and removal of the cassette will immediately expose one or more display surfaces with advertising or like material indicia thereon.

10 Claims, 3 Drawing Sheets

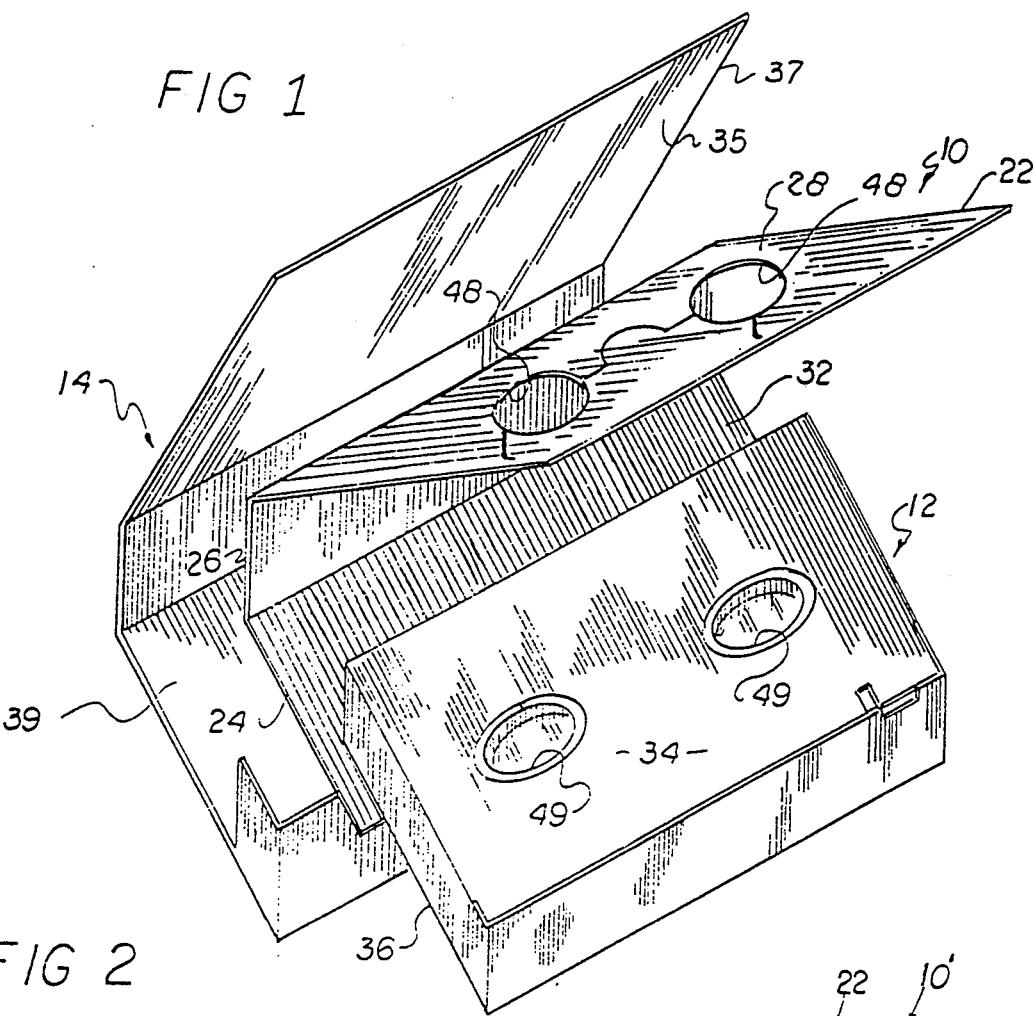
FIG 1
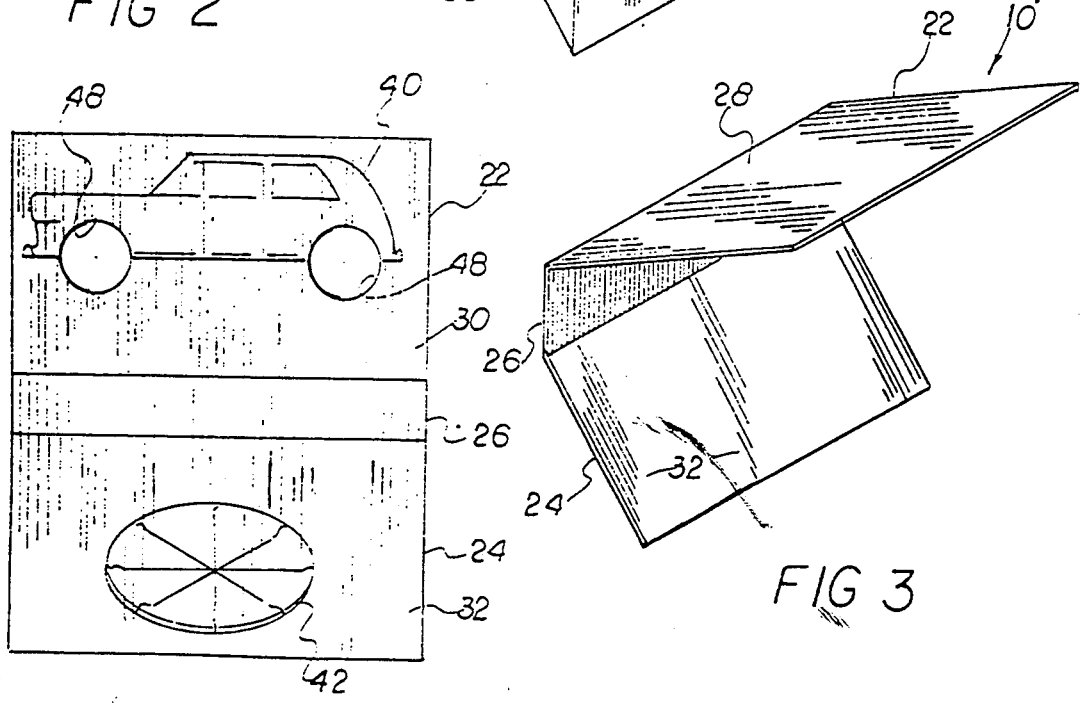
FIG 2
FIG 3

ADVERTISING DISPLAY FOR A VIDEO CASSETTE OR LIKE STRUCTURE

BACKGROUND OF THE INVENTION

1. Field of the Invention

This invention relates to an advertising display structure designed for use with a video or like cassette type structure wherein the display structure includes numerous display surfaces and may be packaged on the interior of a container for the cassette and removed therefrom upon removal of the cassette from the container.

2. Description of the Prior Art

Numerous devices and display structures are available, both commercially and in the prior art, which are specifically designed to accomplish presentation of advertisement to the consuming public. While numerous advertising displays are directed to the consuming public generally, there are certain specific display structures which have a more specified or precise application or which are directed to a predetermined group of consumers.

Naturally all types of respectively, signs, billboards, publication, etc., are well known and rely on certain areas of exposure in order to present the advertising message to the segment of the consuming public most interested. However, relatively few advertising display structures have the capability of being used in combination with a specific product which itself is distributed on a somewhat limited and specified basis to a certain segment of the public. The wide spread use of video cassette recorders has resulted in an evergrowing number of retail outlets specifically designed to accomplish the rental of video cassettes for a relatively short period of time. Such rentals have become increasingly popular and allows the consumer access to a large number of such cassettes, as well as the material thereon, without having to actually purchase the video cassette. In many areas of the United States, as well as other industrialized countries, the ownership and use of video cassette recorders (VCR) is as popular as the ownership and use of television sets.

In the advertising industry, professionals are constantly on the lookout for the ability to effectively isolate a specified segment of society in order to make advertising displays more effective.

Therefore, there is a continuous recognized need in the industry for areas of specific application of display structures, carrying advertising, which is applicable to a predetermined segment of society.

SUMMARY OF THE INVENTION

The present invention is directed to a display structure of the type structurally adapted and specifically designed to provide advertising information and like indicia means to a predetermined or pre-selected segment of the consuming public. In particular, the display structure of the present invention is designed to be used in combination with a cassette structure, such as a video cassette, particularly wherein the video cassette is housed within a cassette container of the type used in video cassette rental stores or like retail outlets.

The subject display structure, while described herein for use as an advertising medium, is obviously structurally capable of being used for other types of displays or adapted to have other type of indicia means formed on exposed display surfaces thereof.

The display structure of the present invention includes a first or upper panel disposed in overlying and/or covering relation to at least a portion of a top face of the video cassette and a second panel disposed in covering relation to an oppositely disposed bottom face of the video cassette. The first and second panels of the subject display structure are movably connected to one another by a base means. The base means is dimensioned and configured to extend along and in substantially overlying relation to a peripheral side or end portion of the video cassette. The display structure is disposed in a somewhat surrounding and at least partially enclosing relation to the video cassette while it is retained on the interior of a video cassette container, typically of the type used to deliver such cassettes in video rental stores.

Each of the first and second panels include oppositely disposed display surfaces on opposite sides of each panel. More particularly, each of the first and second panels include an inner display surface which is disposed in confronting relation to the correspondingly positioned top and bottom faces respectively of the cassette, particularly when the display structures are in their operative position in at least surrounding relation to the video cassette. Similarly, each of the first and second panels have outer display surfaces which, when the cassette is maintained within the interior of the cassette container, are disposed in confronting relation with inner surface portions of the cassette container.

The overall structure and its cooperative engagement relative to the video cassette is such that the cassette may not be removed without display and exposure of a plurality of such display surfaces to the user. The intention when using such a display structure is that upon rental of the video cassette and delivery thereof to the consumer within the cassette container, the consumer will, of course, open the cassette container to accomplish removal of the video cassette. Once this is accomplished, a number of display surfaces will be visually exposed to the viewer and the indicia means in the form of advertising display or like pictorial representation will be easily viewable by the user. Also, the material from which the display structure is formed is flexible and, therefore, easily conformable to the video cassette and may also be purchased and processed at a relatively inexpensive cost such that the advertising displays can be considered a "give-away" item and kept by the consumer for current or future use.

In addition to the indicia means formed on at least one but preferably all of the aforementioned display surfaces, one or more apertures may also be formed therein. These apertures are disposed in aligned registry and/or coaxial disposition relative to the spokes or sprockets of the cassette. Also, each of these apertures are specifically dimensioned and disposed to allow passage therethrough of positioning and support fingers associated with and extending outwardly from inner surface portions of the cassette container. Such posts or fingers are common, dependent upon the type of cassette container utilized in the rental of video cassettes.

BRIEF DESCRIPTION OF THE DRAWINGS

For a fuller understanding of the nature of the present invention, reference should be had to the following detailed description taken in connection with the accompanying drawings in which:

FIG. 1 is a perspective view in partial exploded form of the display structure of the present invention used in FIG. 2 is a front view of the display structure in an open exposed form.

FIG. 3 is a detailed view and perspective of one embodiment of the subject display structure.

Like reference numerals refer to like parts throughout the several views of the drawings.

DETAILED DESCRIPTION OF THE PREFERRED EMBODIMENT

Figure 4:
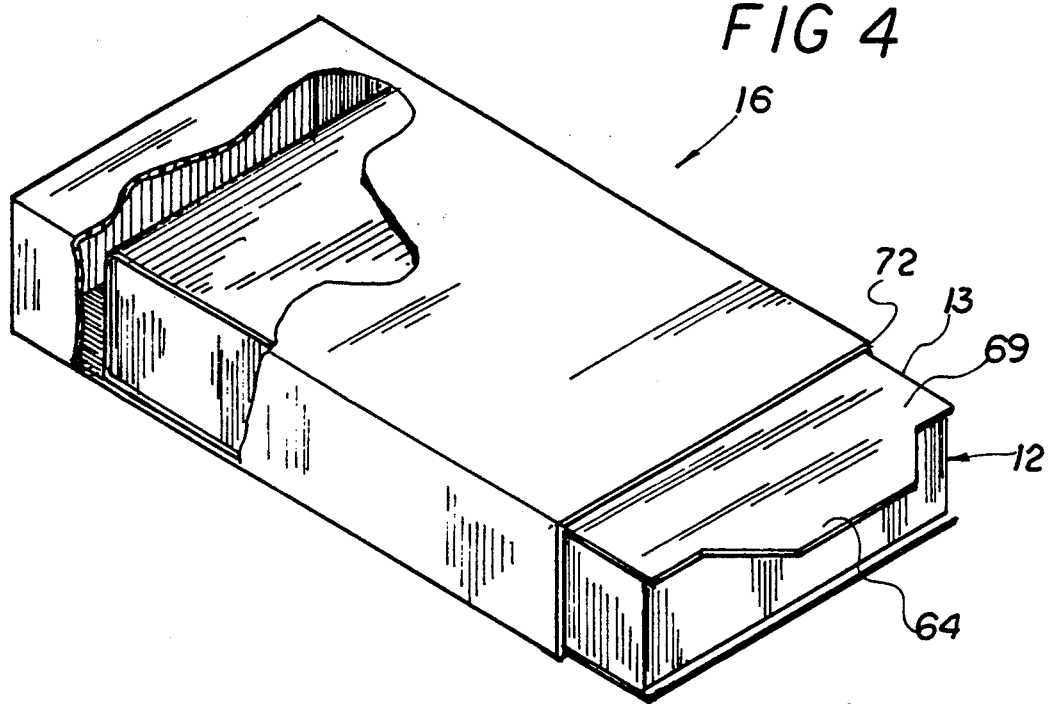
FIG. 4 is a perspective view in partial cutaway of yet another embodiment of the subject display structure.

As shown in FIGS. 1, 2 and 3, the present invention is directed towards a display structure generally indicated as 10 of the type designed to be used in combination with a cassette structure, such as but not necessarily limited to a video cassette and being generally indicated as 12. Further, the display structure 10 is specifically designed to be disposed in somewhat surrounding and overlying relation to the cassette 12 while the cassette is housed within a cassette container generally indicated as 14. The cassette container may take a variety of configurations which are commercially available and which are represented as 16, 18 and 20 in FIGS. 4, 5 and 8, respectively.

The display structure of the present invention and particularly in the embodiment of FIGS. 1 through 3, includes a first panel 22 and a second panel 24 movably or pivotally interconnected by a base means 26. Each of the first and second panels have oppositely disposed display surfaces. More specifically, the first panel 22 includes an outer display surface 28 and an inner display surface 30. The second panel 24 includes an inner display surface 32 and an outer display surface oppositely disposed to the inner display surface 32. In its operative position, when the cassette 12 is mounted on the interior of the container 14, the inner display surfaces 30 and 32 of the first and second panels 22 and 24 are disposed in overlying, at least partially covering and confronting engagement with the top and bottom faces 34 and 36, respectively, of the cassette 12. Similarly, the outer display surface 28 of the first panel 22 is disposed in confronting engagement with an inner surface portion as at 35 of a lid 37 of the container 14. Similarly, the outer display surface of the second panel 24 is disposed in confronting engagement with the inner surface 39 of the container 14. The operative position of the display structure 10 is thereby defined when the cassette 12 is maintained on the interior of the container 14 and the lid portion 37 is closed. Naturally, upon opening of the lid, the viewer will first see the display surface 28 which is clearly exposed to him. Upon lifting the first panel 22 into an upwardly spaced apart relation to the cassette 12, he will next view the inner display surface 30 of the first panel 22. Upon removal of the cassette 12, the inner display surface 32 of the second panel 24 will then be viewable. Finally, upon complete removal of the display structure 10 or 10' as shown in FIG. 3, all the display surfaces of both the first and second panels will be viewable.

Obviously, each of the aforementioned display surfaces are clearly adapted to have indicia means, such as advertising display or pictorial representations formed thereon. In addition to the aforementioned display surfaces, the base 26 may also have appropriate advertising display or like indicia means formed on the inner and outer surfaces thereof so as to provide additional advertising space or display surface area.

Figure 5:
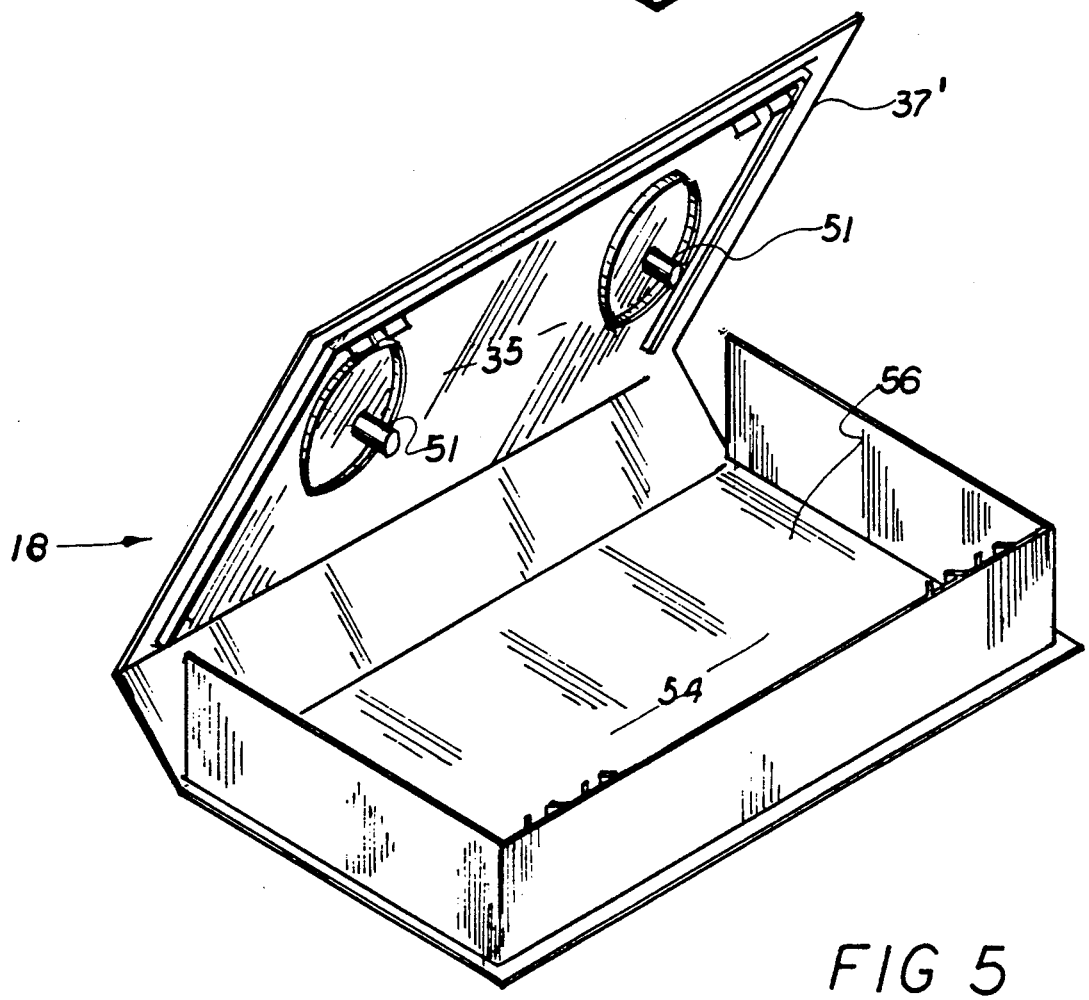
FIG. 5 is a perspective view of a cassette container with which a display structure of the present invention is utilized.
Figure 6:
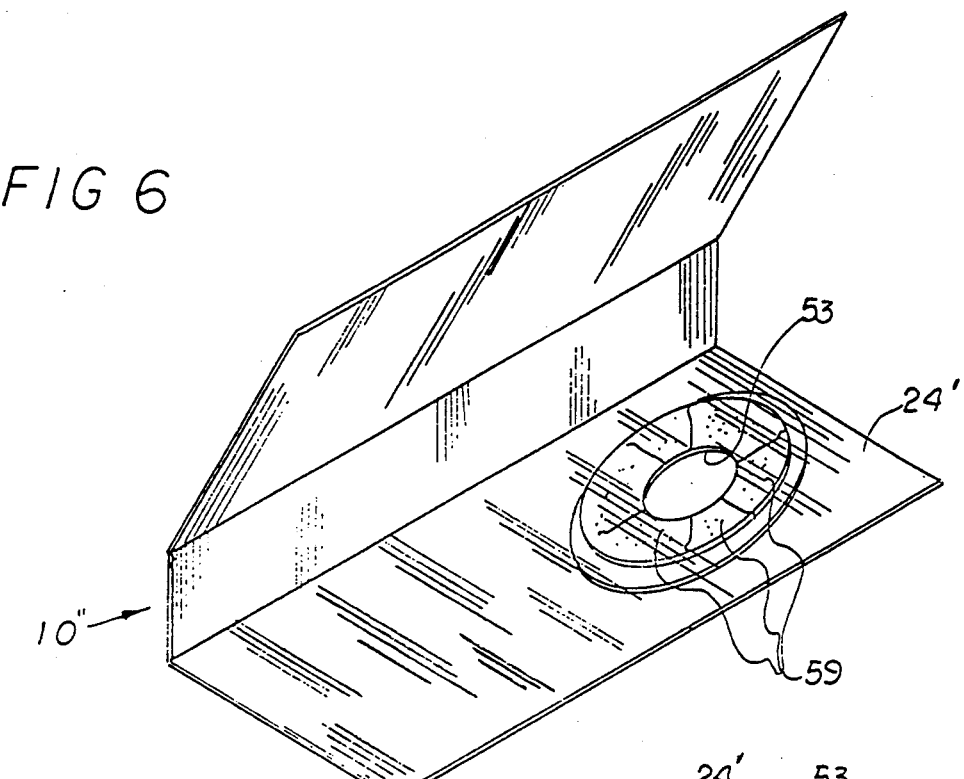
FIG. 6 is a perspective view of yet another embodiment of the present invention.
Figure 7:
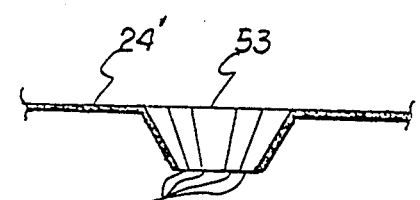
FIG. 7 is a sectional view in partial cutaway of yet another embodiment of the present invention of the type shown in FIG. 6.

With reference to FIGS. 1, 2 and 6, another structural feature of the present invention is the provision of at least one but in some instances two apertures as at 48 formed in at least one of the first or second panels 22 or 24. These apertures 48 are particularly designed to be disposed in registry with the hubs or spoke areas 49 prevalent in all of the video cassette structures 12 so as to render them operable when placed within a video cassette recorder. Also, the apertures 48 are clearly dimensioned and disposed to allow positioning fingers or posts 51 (see FIG. 5) which may be located on various inner surfaces. In FIG. 5, the supporting posts 51 are on and project outwardly from the inner surface portion 35' of the lid 37' of the cassette container 18. However, such posts could also be present on the inner surface portion 54 of the base portion 56 of the cassette container 18. Similar support posts could be located on appropriate inner surface portions of the container structure 14.

The one or more apertures 48 could also be an integral and cooperative part of the indicia means such as 40 in FIG. 2 by being a demonstrative part of the pictorial display such as the wheels of an automobile as clearly shown in FIG. 2. This would add to the overall attractive appearance and certainly bring the attention of the viewer or user of the video cassette to focus on the message attempted to be delivered by the advertising display 40 on one of the appropriately disposed display surfaces.

Another embodiment as shown in FIG. 6 wherein a single aperture as at 53 has a gripping means associated therewith. The aperture 53 has a plurality of separable, independently movable gripping fingers 59 formed thereon and positionable out of the plane of the panel 24' and into one of the sockets as at 49 associated with the video cassette 12. By virtue of this gripping action, the display structure 10, 10' or 10" is removably secured to the cassette and is removable therewith particularly wherein the container 20 is of the type where the cassette 12 is slidable into and out of an access opening as at 60.

Figure 8:
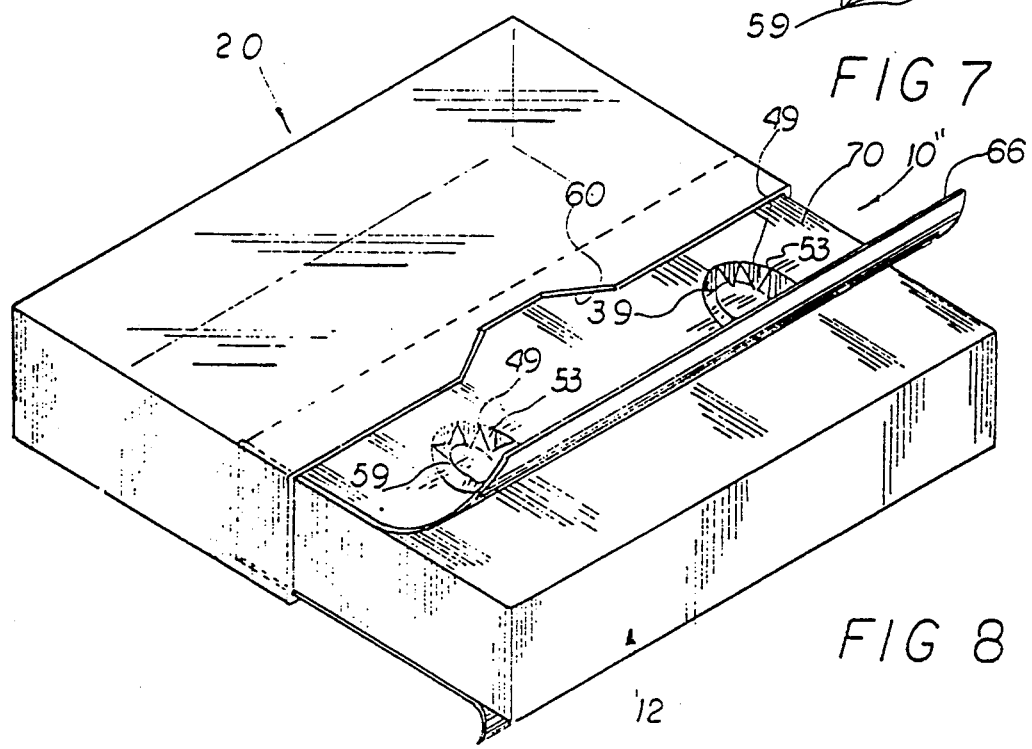
FIG. 8 is a perspective view of yet another embodiment of the present invention.

Yet another embodiment of the present invention is the existence of pull-tabs as at 64 in the embodiment of FIG. 4 and 66 in the embodiment of FIG. 8. Such pull-tabs, dependent upon the embodiment, are located on a free end of the first panel 68 or the free longitudinal side of the first panel 70 in the embodiment of FIG. 8. Such pull-tabs generally project outwardly from the access opening 60 in FIG. 8 and 72 in FIG. 4. This allows free access and easy removal of the cassette 12 from the interior of the container 16 and 20 (see FIGS. 4 and 8) depending upon the overall size and shape of the container. In either embodiment, an outward pulling force exerted on the pull-tabs 64 and 66 will be facilitate removal of the cassette structure 12 as well as the display structure 10" in FIG. 8 and 13 in FIG. 4.

Regardless of the embodiment as shown in the accompanying figures, an additional adaptation to be included in any such embodiment is the provision of a multipanel foldout sheet attached to either of the two panels such as panels 22 and or 24 (see FIG. 1). These panels each may include a number of indicia displays or other advertising media formed thereon on either of two opposite surfaces. Each of the panels are folded relative to one another and to the panel 22 or 24 to which it is attached in an accordion or overlapping type fashion. Also each of the connected, fold out panels may be aperture so as to accommodate a particular style of container of the type generally indicated as 14 in FIG. 1 or 20 in FIG. 8.

Now that the invention has been described,
What is claimed is:

1. An advertising display structure designed to removably engage a cassette structure such as a video cassette and be removably mounted within a cassette container, said structure comprising:
   a) a first panel disposed in overlying, covering relation with at least a portion of a top face of the cassette,
   b) a second panel movably connected to said first panel and disposed in overlying and covering relation to at least a portion of a bottom face of the cassette,
   c) a base portion movably interconnecting said first panel and said second panel and disposed in overlying relation to at least a portion of a periphery of the cassette,
   d) said first panel, second panel, and base portion structurally adapted and congruently configured to assume an operative position defined by at least partially surrounding the cassette while within the cassette container,
   e) said operative position further defined by said first and second panels removably disposed in substantially sandwiched relation between said top and bottom faces respectively and correspondingly positioned inner surface portions of the cassette container,
   f) said first and second panels each including an outer display surface and an inner display surface oppositely disposed relative to one another, said outer display surface of each panel disposed in confronting engagement with a correspondingly positioned inner surface portion of the cassette container, and in a visually exposed position when said first and second panels are in said operative position and said inner display surface of each panel being disposed in a visually exposed position when spaced outwardly from the cassette and not in said operation position,
   g) at least one of said first or second panels including at least one aperture formed therein and disposed in aligned registry with a hub portion of the cassette, said one aperture structurally adapted to allow passage therethrough of a support post formed on an inner portion of the cassette container, and
   h) indicia means selectively disposed on said outer and inner display surfaces of said first and second panels, said one aperture adapted to be an integral part of a pictorial display defining said indicia means on said one panel.

2. A structure as in claim 1 wherein said base extends along and is connected to correspondingly disposed longitudinal side edges of said first and second panel.

3. A structure as in claim 2 wherein said base includes a longitudinal dimension equal to at least a majority of the length of the cassette and a width sufficient to overly a longitudinal side of the cassette.

4. A display structure as in claim 3 wherein at least one of said first and second panels includes a pull-tab secured to an outer longitudinal side thereof and structurally adapted to normally project outwardly from the cassette container when in an operative position, whereby the cassette can be removed from the cassette container by exerting a pulling force on said pull-tab.

5. A display structure as in claim 1 wherein said base extends along and is connected to correspondingly disposed transverse end edges of said first and second panels.

6. A display structure as in claim 4 wherein said base includes a longitudinal dimension equal to at least a majority of the transverse dimension of the cassette and a width sufficient to overly a transverse side of the cassette.

7. A display structure as in claim 5 wherein at least one of said first or second panels includes a pull-tab secured to an outer free end thereof and structurally adapted to normally project outwardly from the cassette container when in an operative position, whereby the cassette can be removed from the cassette container by exerting a pulling force on said pull-tab.

8. A display structure as in claim 1 wherein said one panel includes two apertures disposed in spaced apart relation and each aperture disposed in aligned registry with a different hub portion of the cassette, each of said apertures dimensioned and configured to allow a passage therethrough of a different one of two support posts formed on an inner portion of the cassette container.

9. A display structure as in claim 1 further comprising gripping means formed about a peripheral portion of said one aperture and extendable outwardly of a plane of said one panel into removably gripping engagement with the correspondingly positioned hub of the cassette.

10. A display structure as in claim 9 wherein said gripping means comprises a plurality of fingers movably mounted on the peripheral edge of said one aperture and movable into and out of the plane of said one panel and into gripping engagement with the correspondingly positioned hub of the cassette.

* * * * *